US007029149B2

(12) United States Patent
Tung

(10) Patent No.: US 7,029,149 B2
(45) Date of Patent: Apr. 18, 2006

(54) LASER ALIGNMENT DEVICE OF A CIRCULAR SAW MACHINE

(76) Inventor: Hsin Chih Tung, P.O. Box 26-757, Taipei (TW)

( * ) Notice: Subject to any disclaimer, the term of this patent is extended or adjusted under 35 U.S.C. 154(b) by 197 days.

(21) Appl. No.: 10/719,791

(22) Filed: Nov. 18, 2003

(65) Prior Publication Data
US 2005/0117613 A1    Jun. 2, 2005

(51) Int. Cl.
*G02B 27/20* (2006.01)
(52) U.S. Cl. ........................... 362/259; 362/553
(58) Field of Classification Search ................ 362/259, 362/119, 553; 408/16; 372/1; 33/DIG. 21
See application file for complete search history.

(56) References Cited

U.S. PATENT DOCUMENTS 6,584,695 B1 * 7/2003 Chang .......................... 30/391
6,755,107 B1 * 6/2004 Peot et al. ..................... 83/478

* cited by examiner

*Primary Examiner*—Renee Luebke
*Assistant Examiner*—Leah S Lovell
(74) *Attorney, Agent, or Firm*—Rosenberg, Klein & Lee

(57) ABSTRACT

A laser alignment device of a circular saw machine includes a cover, a laser module, and a power control-supply unit. The cover defines a plurality of laser holes on a edge of the cover and a plurality of rectangular receiving slots. The laser module includes a rectangular base fixed in the rectangular receiving slot and a laser source-having a shooting portion corresponding to the laser hole. The power control-supply unit electrically connects to the laser module for simplifying parts and adding assembly speed.

7 Claims, 7 Drawing Sheets

LASER ALIGNMENT DEVICE OF A CIRCULAR SAW MACHINE

BACKGROUND OF THE INVENTION

(1) Field of the Invention

The present invention relates to a laser alignment device of a circular saw machine and more particularly to a laser alignment device of a circular saw, wherein the laser alignment device is made use of assisting a circular saw cutter in aiming at a preparatory cutting line.

(2) Description of the Related Art

A circular saw machine has a fast and straight feature that efficiently finishes a work of cutting. The kinds of circular saw machines include a manual circular saw machine that the circular saw is pushed to cut a cutting material fixed position and a table type circular saw machine that the cutting material is cut by the circular saw fixed position. Marking preparatory cutting line on the cutting material before starting to cut is for keeping the circular saw cutter on the preparatory cutting line. The laser alignment device is mounted in the circular saw cutter machine for assisting the circular saw cutter in keeping on the preparatory cutting line.

Referring to FIGS. 1~3, a prior laser alignment device of the circular saw machine includes a cover, a laser module 6, and a power control-supply unit 7. The cover has a laser hole 50 defined on an edge of the cover, a top cover 52 and a bottom cover 53. The top cover 52 has a central hole 524, and the bottom cover 53 has a sinking central-hole 534 corresponding to the central hole 524 for inserting a bolt (not be shown) to fix the circular saw machine (not be shown). The top cover 52 further has a battery receiving slot 526, a conductive-slice receiving slot 527 and a printed circuit board-receiving slot 581 near the central hole 524. The bottom cover 53 has a cambered receiving slot 535, a battery receiving slot 536 and a printed circuit board-receiving slot 582 near the sinking central-hole 534. The laser module 6 includes a cylindrical base 64, a laser source 65 and a rhomboidal prism 66. The cylindrical base 64 is received in the cambered receiving slot 535. The laser source 65 is arranged in the cylindrical base 64. The rhomboidal prism 66 is arranged between the laser source 65 and the laser hole 50. The rhomboidal prism 66 has two mal-position parallel surfaces respectively corresponding to a shooting portion 60 of the laser source 65 and the laser hole 50. The laser module 6 electrically connects to a printed circuit board 61 and the printed circuit board 61 has a conductive area 611. The printed circuit board-receiving slot 582 has a protruding post 583 for fixing the printed circuit board 61. The laser module 6 has a fixing slice 62 on an edge of the laser module 6 and the fixing slice 62 is fixed on the bottom cover 53 by a screw 621. The power control-supply unit 7 includes a battery 70, a vibrating switch 71, a conductive slice 72 and a printed circuit board 74. The battery 70 is received in the battery-receiving slot 526. The conductive slice 72 is fixed in the conductive-slice receiving slot 527 by a screw 721 and connected to the battery 70 for conducting electricity. The printed circuit board 74 fixed in the printed circuit board-receiving slot 581 has a vibrating switch 71, a contact point 741, and an elastic slice 742. The vibrating switch 71 electrically connects to a conductive slice 72 connected with a positive end of battery 70. The contact point 741 electrically connects to another conductive slice 72 connected with a negative end of battery 70. After assembling the top cover 52 and the bottom cover 53, the contact point 741 electrically connecting with the conductive area 611 and the elastic slice 742 electrically connecting with the laser module 6 are for conducting electricity.

Referring to FIG. 3, the laser alignment device is fixed on the central position of a circular saw 8 of a circular saw machine. As rotating the circular saw 8 to cut, the laser source 65 shoots the laser 63 conducted to a cutting material 9 by a secondary refraction of the rhomboidal prism 66 for aiming at the preparatory cutting line 90 to assist in cutting.

About prior laser alignment device of a circular saw machine, a power of the laser is reduced by the secondary refraction of the rhomboidal prism 66, so that results in the laser.

As using the prior laser alignment device of the circular saw machine, the laser is not easy to keep on the preparatory cutting line 90, so that results in cutting dimension wrong.

Moreover, the prior laser alignment device of the circular saw machine has too many parts therein, so results in long assembling time, low producing efficiency, and high costs.

Therefore, the prior laser alignment device of the circular saw machine still has some inconveniences and shortcomings in using. For this reason, it is worthy of our continued improve.

With the employment of unique considerations and application of theories, and based on several years experience in specialized production of all flexible assembly systems and mechanisms, so that the inventor has come up with a laser-positioning device of circular saw machine.

SUMMARY OF THE INVENTION

The primary-purpose of the present invention is to provide a laser alignment device of a circular saw machine that makes a laser shot from a laser module to approach a circular saw cutter more closely and raises the accuracy of the laser alignment device for assisting a cutting path of the circular saw in aiming at a preparatory cutting line of a cutting material.

The secondary purpose of the present invention is to provide a laser alignment device of the circular saw machine for simplifying design of the parts, assembling fast, raising producing efficiency, and reducing costs.

In order to achieve above purposes, the present invention is to provide a laser alignment device of the circular saw machine including a cover, a laser module, and a power control-supply unit.

The cover includes a laser hole on an edge of the cover, a rectangular receiving slot on a inside, a fixing structure for fixing the circular saw machine.

The laser module includes a rectangular base arranged in the rectangular receiving slot and a laser source arranged in the rectangular base. A shooting portion of the laser source directly aims at the laser hole.

The power control-supply unit is arranged in the cover and electrically connected to the laser module.

The shooting portion of the laser source directly aims at the laser hole, so that the power of the laser isn't lost and the accuracy of the laser alignment device is raised.

The power control-supply unit connects to the laser module for simplifying parts of the laser alignment device and adding assembly speed.

It is to be understood that both the foregoing general description and the following detailed description are exemplary, and are intended to provide further explanation of the invention as claimed.

Other advantages and features of the invention will be apparent from the following description, drawings and claims.

BRIEF DESCRIPTION OF THE DRAWINGS

Other objects, features and advantages of the present invention will be more apparent from the following detailed description when read in conjunction with the accompanying drawings in which.

DETAILED DESCRIPTION OF THE PREFERRED EMBODIMENT

A description will now be given of the preferred embodiments of the present invention with reference to the accompanying drawings.

Figure 1:
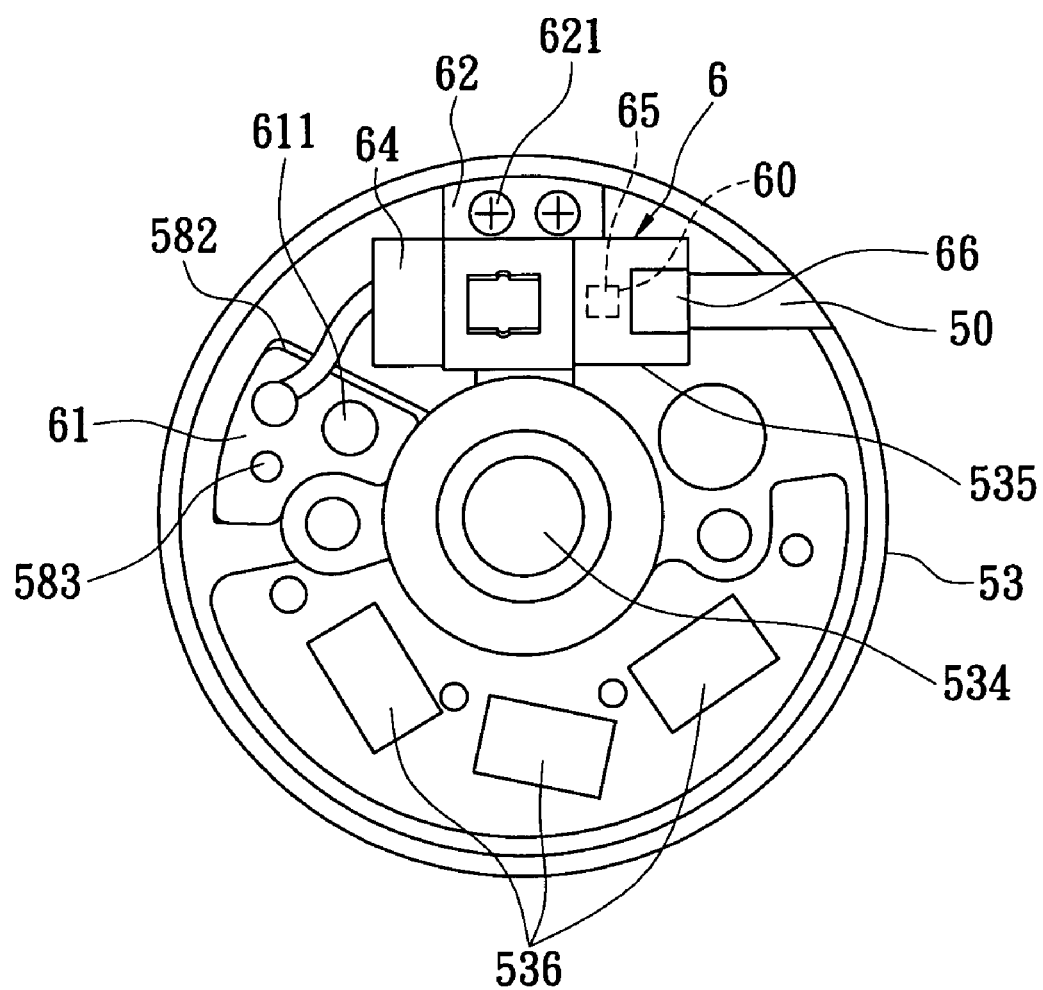
FIG. 1 is a plan schematic view of the bottom cover, the laser module of the prior laser alignment device of the circular saw machine.
Figure 2:
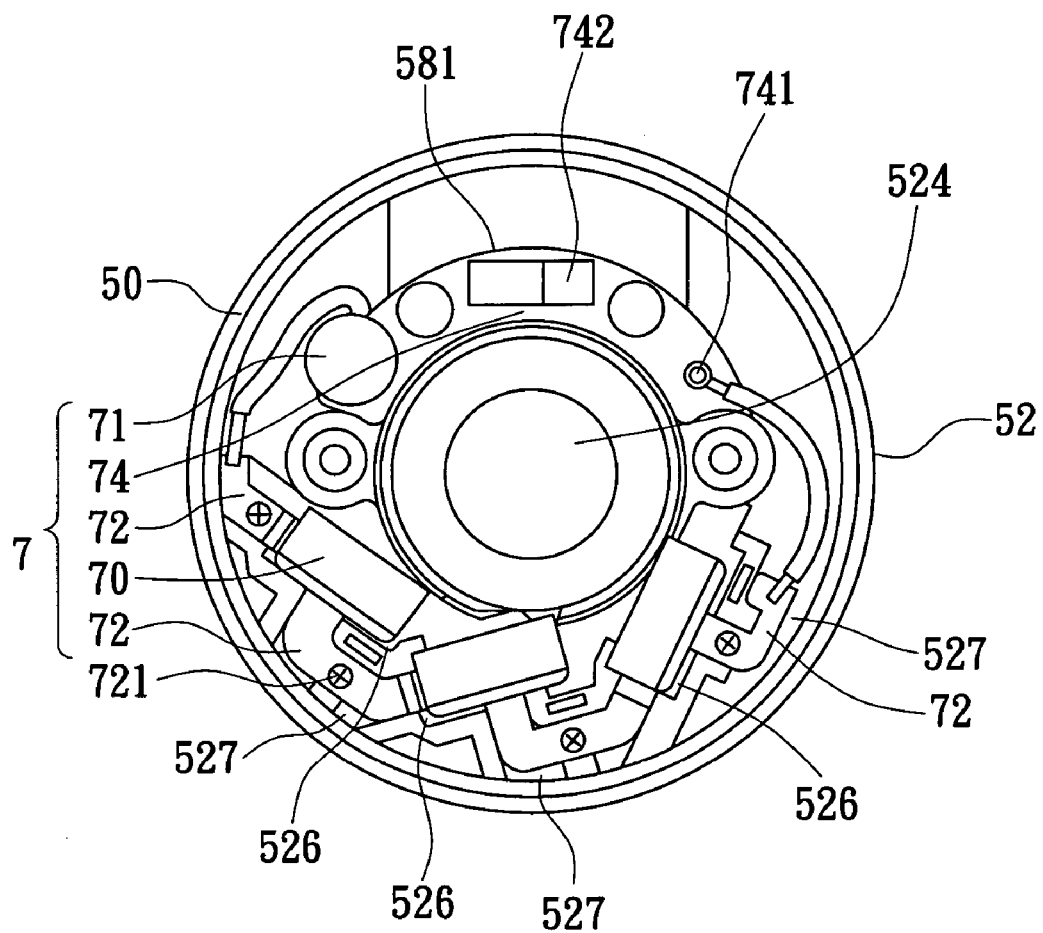
FIG. 2 is a plan schematic view of the top cover, power control-supply unit of the prior laser alignment device of the circular saw machine.
Figure 3:
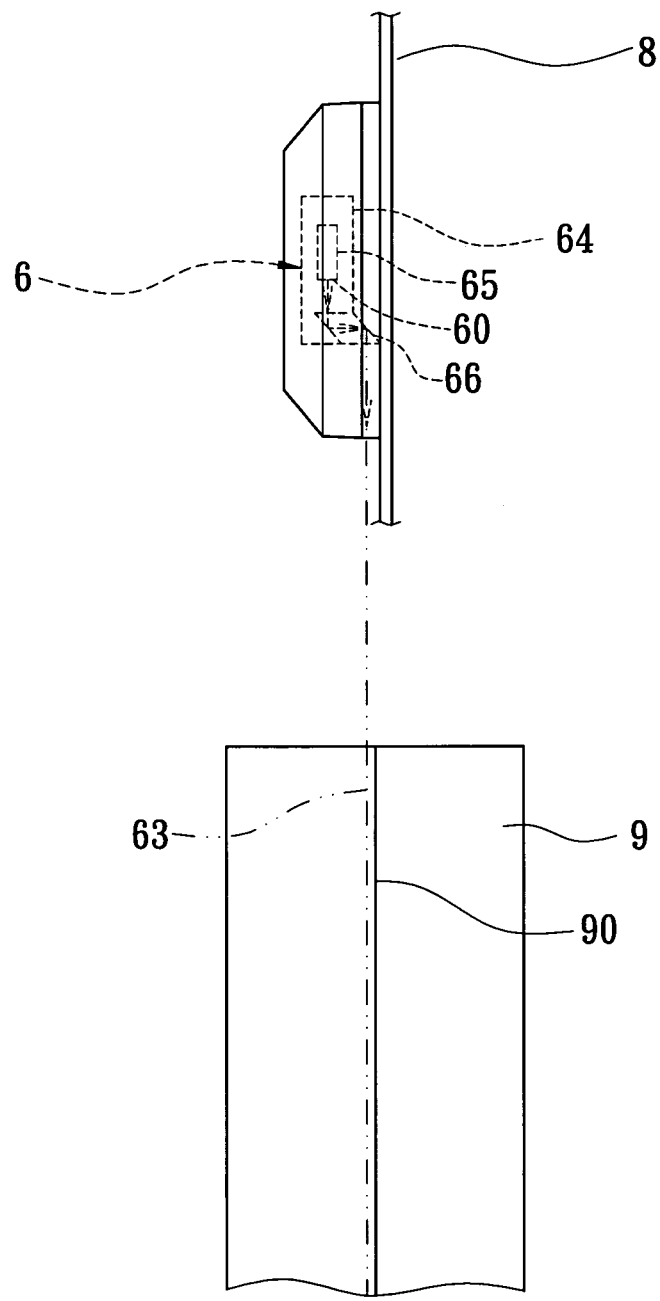
FIG. 3 is an action plan schematic view of the prior laser alignment device of the circular saw machine.
Figure 4:
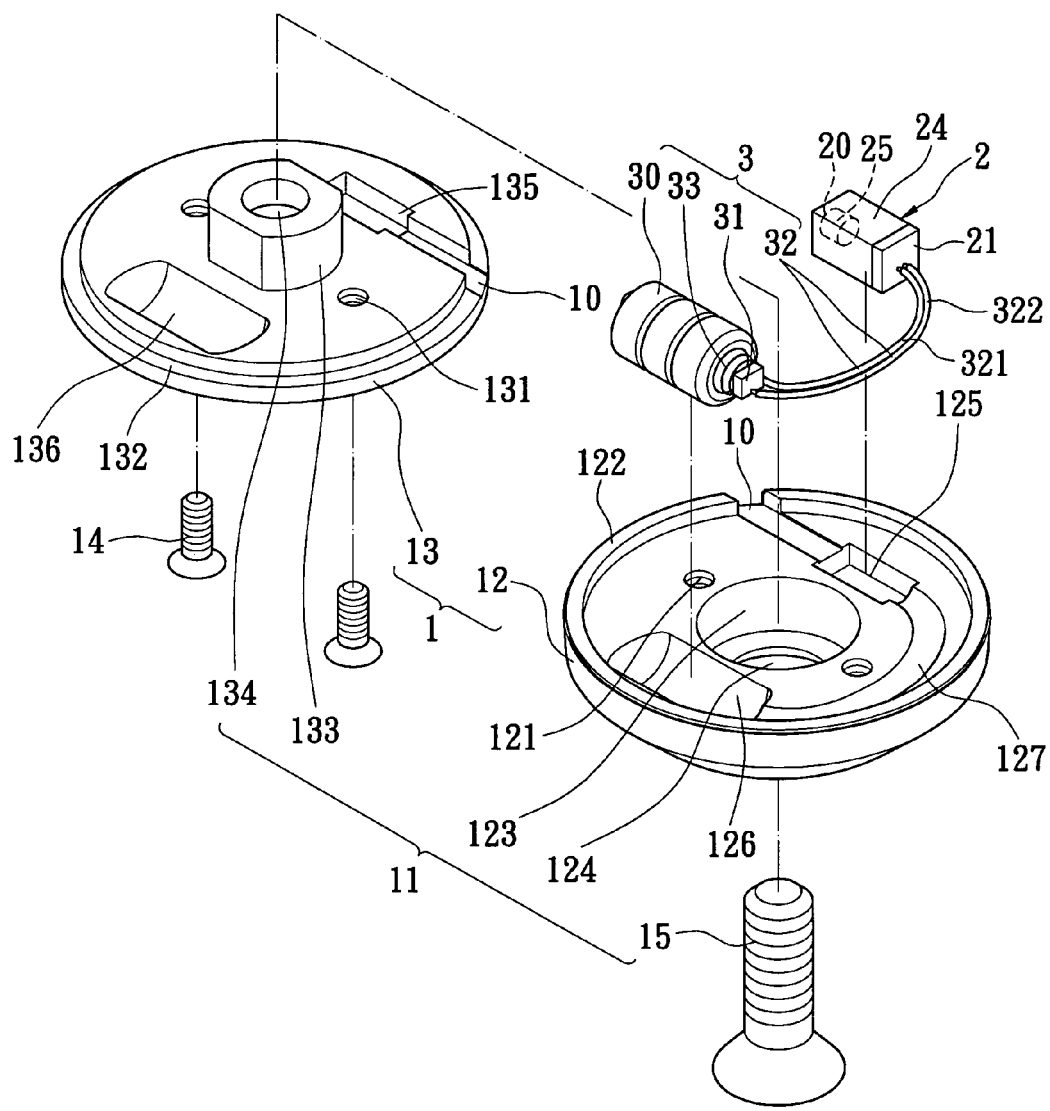
FIG. 4 is a partial exploded view of the present invention.
Figure 5:
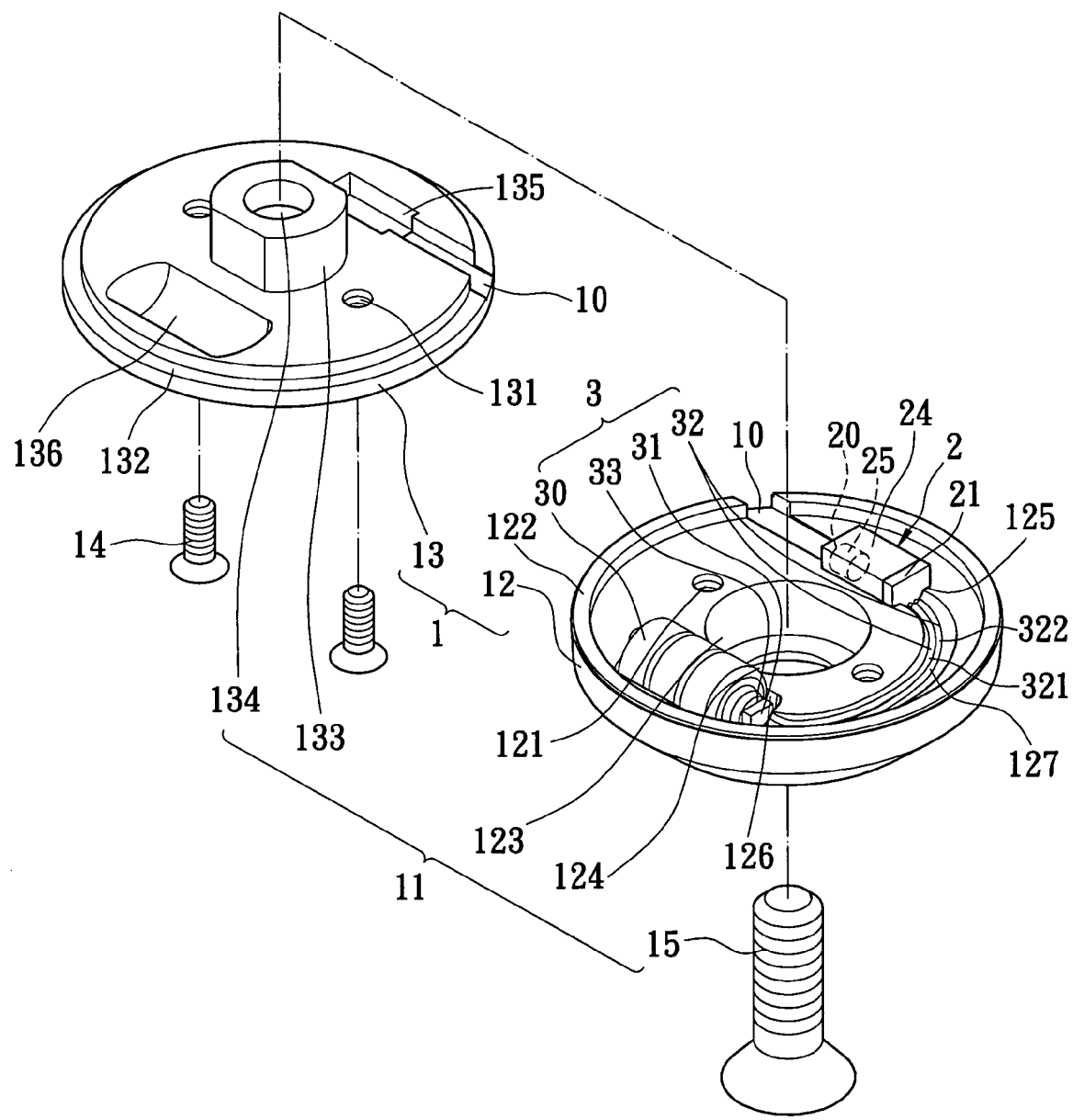
FIG. 5 is a partial assembled view of the present invention.
Figure 6:
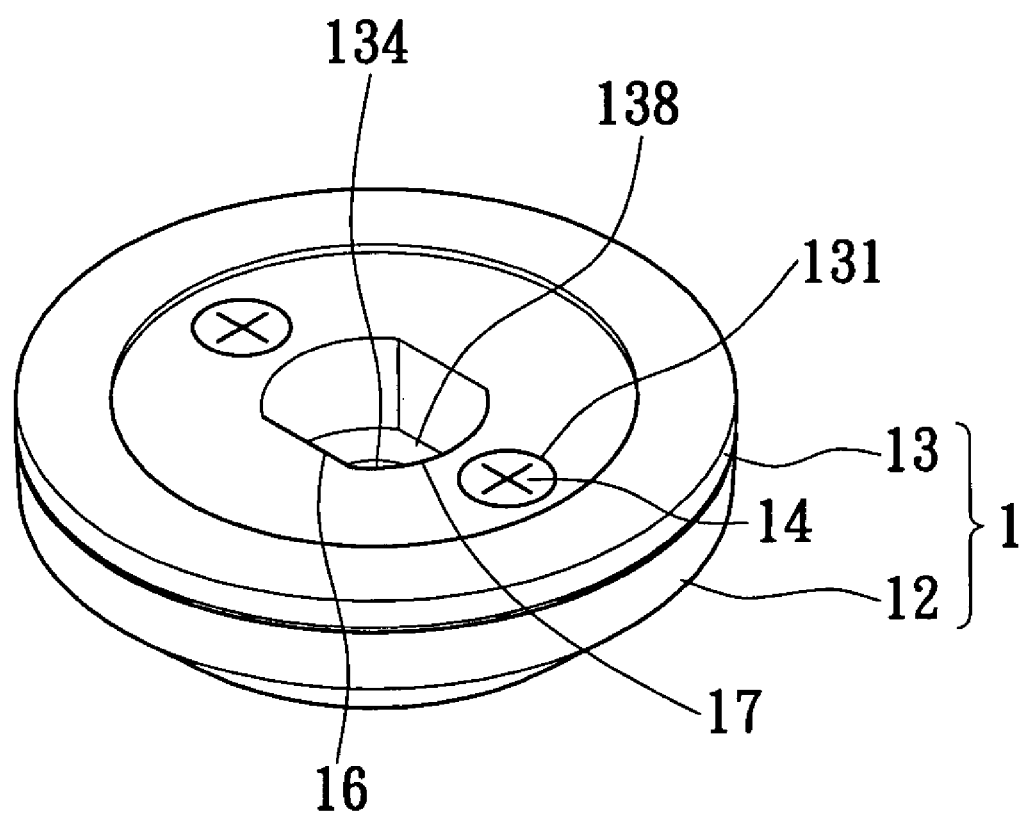
FIG. 6 is a perspective view of another viewpoint of the present invention.

Please referring to FIG. 4~6, the present invention is a laser alignment device of a circular saw machine, including a cover 1, a laser module 2 and a power control-supply unit 3.

The cover 1 defines a plurality of laser holes 10 on an edge of the cover 1 and a plurality of rectangular receiving slots 125, 135 therein; moreover, the cover further includes a fixing structure 11 for fixing the circular saw machine. The cover 1 includes a top cover 12 and a bottom cover 13, an inside of the top cover 12 is relative to an inside of the bottom cover 13. The top cover 12 has a plurality of screw bases 121 on an inside thereof, a bottom cover 13 defines a plurality of sinking holes 131 on an outside of the bottom cover 13 and a plurality of bolts 14 inserting into each of sinking holes 131 for locking the screw base. The top cover 12 has a protruding ring 122 on an inside of the top cover 12 and the bottom cover 13 has a concave ring 132 on a inside of the bottom cover 13, the protruding ring 122 mates with the concave ring 132. The fixing structure 11 defines a inner-concave portion 123 on the inside of the top cover 12 and a inner-protruding portion 133 on the inside of the bottom cover 13, the inner-concave portion 123 defines a central hole 124 and the inner-protruding portion 133 has a sinking central hole 134 corresponding to the central hole 124 for fixing the circular saw machine by inserting a bolt 15, the inner-protruding portion 133 is received in the inner-concave portion 123. The bottom cover 13 defines a sinking portion 138 on the outside of the bottom cover 13 and the sinking portion 138 is composed of two parallel surfaces 16 and two cambered surfaces 17 for covering a fixing shaft of the circular saw machine, the sinking central hole 134 is formed on the sinking portion 138.

The laser module 2 includes a rectangular base 24 and a laser source 25.

The rectangular base 24 is retained in the rectangular receiving slots 125, 135.

The laser source 25 is arranged in the rectangular base 24 and has a shooting portion 20 corresponding to the laser hole 10.

The power control-supply unit 3 is arranged in the cover 1 and electrically connects to the laser module 2; the power control-supply unit 3 includes a battery 30, a vibrating switch 31, a wire 32 and an elastic part 33.

The top cover 12 and the bottom cover 13 both has a battery receiving slot 126(136) corresponding to the battery 30, a wire receiving slot 127 corresponding to the wire 32 and a plurality of rectangular receiving slots 125, 135 on the inside thereof. A negative end of the battery 30 electrically is connected to the vibrating switch 31 and received in the battery receiving slot 126(136), the elastic part 33 is arranged on a inside of the battery receiving slot 136 for closely pressing the battery 30 and the wire 32 is received in the wire receiving slot 127; the laser module 2 has a printed circuit board 21, the wire 32 has a positive electrode 321 and a negative electrode 322, a end of the positive electrode 321 connects to a positive end of the battery 30 and another end of the positive electrode 321 connects to the printed circuit board 21, an end of the negative electrode 322 connects to the vibrating switch 31 and another end of the negative electrode 322 connects to the printed circuit board 21.

After the laser module 2 and the power control-supply unit 3 electrically connect together and assembled in the cover 1, the laser module 2 is arranged near outside of the bottom cover 13. The laser source 25 has a shooting portion 20 directly aiming at the laser hole 10, so that a laser shot from the laser source 25 doesn't lose power without secondary refraction of the rhomboidal prisms.

The laser shot from the laser source 25 effectively assists the cutting path of the circular saw in aiming at the preparatory cutting line of the cutting material; therefore, the accuracy of the laser alignment device is effectively raised; moreover, the battery 30, the vibrating switch 31 and the wire 32 are arranged closely for reducing parts, adding assembly speed, raising producing efficiency, and reducing costs.

Figure 7:
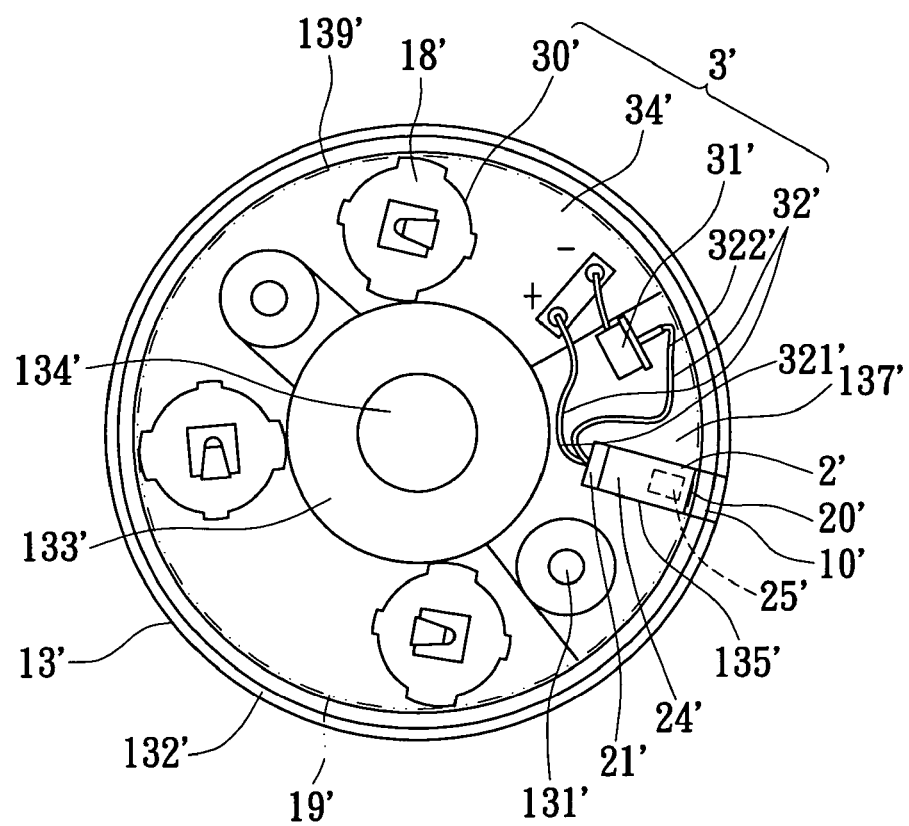
FIG. 7 is a plan schematic view of the bottom cover, laser module, power control-supply unit of another preferred embodiment.

Please referring to FIG. 7, it is a plan view of a bottom cover 13', a laser module 2', a power control-supply unit 3' of another preferred embodiment of the present invention.

The power control-supply unit 3' includes a ringlike circuit board 34', a battery 30', a vibrating switch 31' and a wire 32'.

The bottom cover 13' has a ringlike circuit board receiving slot 139' and a wire receiving slot 137' on an inside of the bottom cover 13'.

Each of negative ends of the batteries 30' electrically connects to respective negative connecting points of the circuit board 34'.

Each of positive ends of the batteries 30' electrically connects to respective conductive pressing-slices 18' and each of the conductive pressing-slices 18' electrically connects to respective positive connecting points of the circuit board 34' for series connection of the batteries 30' by the circuit board 34', a negative end of the circuit board 34' electrically connects to the vibrating switch 31', the wire 32' is received in the wire receiving slot 137', the laser module 2' has a printed circuit board 21', the wire 32' has a positive electrode 321'and a negative electrode 322', a end of the positive electrode 321' connects to a positive end of the circuit board 34' and another end of the positive electrode 321' connects to the printed circuit board 21', a end of the negative electrode 322' connects to the vibrating switch 31' and another end of the negative electrode 322' connects to the printed circuit board 21', the conductive pressing-slice 18' is covered with insulative film 19' and closes the top cover and the bottom cover 13' to closely press the conductive pressing-slice 18' for fixing the battery 30'.

According to above description, the present invention has following advantages:

(1) The laser source 25 has a shooting portion 20 directly aiming at the laser hole 10, so that a laser shot from the laser source 25 doesn't lose power. The laser shot from the laser source 25 effectively assists the cutting path of the circular saw in aiming at the preparatory cutting line of the cutting material; therefore, the accuracy of laser positioning device is effectively raised.

(2) The battery 30, vibrating switch 31 and wire 32 are arranged closely for reducing parts, adding assembly speed, raising producing efficiency, and reducing cost.

Therefore, the foregoing is considered as illustrative only of the principles of the invention. Further, since in the art, it is not desired to limit the invention to the exact construction and operation show and described, and accordingly, all suitable modifications and equivalents may be resorted to, falling within the scope of the invention.

What is claimed is:

1. A laser alignment device of a circular saw machine, comprising:
   a cover having a laser hole on an edge of the cover and a rectangular receiving slot, the cover further including a fixing structure for securement to the circular saw machine;
   a laser module including a base having a parallelepiped contour and a laser source, the base being fixed in the rectangular receiving slot, the laser source being arranged in the base and having an emitting portion aligned with the laser hole and devoid of a prism adjacent to the emitting portion; and
   a power control-supply unit arranged in the cover and electrically connecting to the laser module.

2. The laser alignment device of a circular saw machine as claimed as claim 1, wherein the cover includes a top cover and a bottom cover, an inside surface of the top cover facing an inside surface of the bottom cover, the top cover having a plurality of screw bases on a inside of the top cover, the bottom cover having a plurality of sinking holes formed in an outside of the bottom cover in respective correspondence with the screw bases, and a plurality of bolts being respectively inserted through the sinking holes and screwed into the corresponding screw bases.

3. The laser alignment device of a circular saw machine as claimed as claim 2, wherein the top cover has a protruding ring on a circumference of the inside of the top cover and the bottom cover has a concave ring on a circumference of the inside of the bottom cover, the protruding ring being matingly engaged with the concave ring.

4. The laser alignment device of a circular saw machine as claimed as claim 1, wherein the cover includes a top cover and a bottom cover, an inside of the top cover faces an inside of the bottom cover, the fixing structure defines an inner-concave portion on the inside of the top cover and an inner-protruding portion on the inside of the bottom cover, the inner-concave portion defines a central hole and the inner-protruding portion has a sinking central hole, the inner-protruding portion is received in the inner-concave portion, the sinking central hole of the inner-protruding portion being in correspondence to the central hole of the inner-concave portion for securement to the circular saw machine by inserting a bolt therethrough.

5. The laser alignment device of a circular saw machine as claimed as claim 4, wherein the bottom cover defines a sinking portion on an outside of the bottom cover, the sinking portion being composed of two parallel surfaces and two cambered surfaces for covering a fixing shaft of the circular saw machine, the sinking central hole of the bottom cover being formed on the sinking portion.

6. The laser alignment device of a circular saw machine as claimed as claim 1, wherein the cover includes a top cover and a bottom cover, an inside of the top cover faces an inside of the bottom cover, the power control-supply unit includes a battery, a switch, a wire and an elastic part, the inside of the top cover and the inside of the bottom cover both have a battery receiving slot corresponding to each other for receiving the battery and a wire receiving slot corresponding to each other for receiving the wire, the switch being electrically connected to a negative electrode of the battery and received in the battery receiving slots, the elastic part being arranged in the battery receiving slots for pressing against the battery, the laser module having a printed circuit board, the wire having a positive electrode part and a negative electrode part, an end of the positive electrode part being connected to to a positive electrode of the battery and another end of the positive electrode part being connected to the printed circuit board, an end of the negative electrode part being connected to the switch and another end of the negative electrode part being connected to the printed circuit board.

7. The laser alignment device of a circular saw machine as claimed as claim 1, wherein the cover includes a top cover, a bottom cover and a plurality of conductive pressing plates, an inside of the top cover faces an inside of the bottom covers, the power control-supply unit includes a ringlike circuit board, a plurality of batteries, a switch and a wire, the top cover having a battery receiving slot on the inside thereof, the bottom cover having a ringlike circuit board receiving slot and a wire receiving slot on the inside thereof, a negative electrode of each of the batteries electrically connects to a corresponding negative electrode connecting point of the circuit boards, a positive electrode of each of the batteries electrically connects to a corresponding conductive pressing plate, each of the conductive pressing plates electrically connects to a corresponding positive electrode connecting point of the circuit board for series connection of the batteries by the circuit board, a negative electrode of the circuit board electrically connects to the switch, the wire being received in the wire receiving slot, the laser module having a printed circuit board, the wire having a positive electrode part and a negative electrode part, an end of the positive electrode part being connected to a positive electrode of the ringlike circuit board and another end of the positive electrode part being connected to the printed circuit board, an end of the negative electrode part being connected to the switch and another end of the negative electrode part being connected to the printed circuit board, the conductive pressing plates being covered with a insulative film, the top cover and the bottom cover enclose the power control-supply unit and press the conductive pressing plates for securing the batteries.

* * * * *